Fig. 1.

INVENTOR
EDGAR JEAN MARCEL DARDAINE
BY
Kenyon & Kenyon
ATTORNEYS

United States Patent Office 3,190,434
Patented June 22, 1965

3,190,434
GROUPING AND SPACING DEVICE
Edgar Jean Marcel Dardaine, Poissy, France, assignor to E. P. Remy & Cie, Poissy, France, a corporation of France
Filed Oct. 30, 1962, Ser. No. 234,112
Claims priority, application France, Nov. 7, 1961, 878,224, 878,225
6 Claims. (Cl. 198—34)

It is the essential object of the present invention to provide an apparatus for equipping an installation for handling miscellaneous articles or objects such as bottles, boxes, etc., this apparatus being designed for properly arranging, on at least one conveyor belt or the like, said objects or articles previously disposed in a random fashion on said belt, in order to permit the gripping of these objects or articles by means of gripping heads or like devices disposed in fixed spaced relationship.

It is known that for automatically encasing or packing bottles, boxes or the like, installations are used which comprise one or more conveyor belts feeding these objects to a position under gripping devices or heads adapted in turn to grip these objects and transfer them into crates for transport or similar purposes. As each gripping head can only grip a predetermined number of objects corresponding on the other hand to the number of compartments or like spaces of each crate, it is necessary, before bringing these objects under the gripping heads, to group a proper number of these objects and to so dispose them that their relative spacing or the relative spacing between any two adjacent objects corresponds exactly to the spacing to be obtained in the crate as a consequence of the presence of inner partitions or like dividing elements therein.

It is the primary object of this invention to provide an apparatus adapted to meet automatically this requirement and remarkable notably in that it comprises in combination a grouping device and a distributing device located after said grouping device in relation to the direction of motion of the conveyor belt, said grouping and distributing devices being driven in synchronism with said belt at any suitable respective speeds differring from the linear velocity of the conveyor belt, and being furthermore provided with retaining members adapted to engage and guide said objects.

The grouping device according to this invention comprises a plurality of stop members or like means disposed at spaced intervals and movable in relation to the conveyor belt in a direction parallel to the direction of motion of said belt, said stop members being adapted to be inserted between at least two objects to be handled, so that these objects will travel at the same rate as the stops and are distributed over the belt into homogeneous, separate groups each comprising a predetermined number of objects contacting one another.

According to another feature characterizing this invention said stop members or like means are mounted on a driving member receiving a cyclic motion and comprising at least one rectilinear portion parallel to said conveyor belt.

It is a further feature of this invention to mount said stop members on supports adjustable relative to said driving member, so that by varying the relative spacing between two adjacent stop members a predetermined number of objects may be selected for constituting a complete group.

The distributing device according to this invention is remarkable notably in that it comprises a plurality of pins or like drive members moving in the direction of travel of said conveyor belt and adapted to be inserted between two adjacent objects contacting each other and to move these objects with respect to each other on said belt, whereby the objects are brought to the gripping place with the proper relative spacing.

The aforesaid pins or like drive members are mounted on a driving member having a cyclic motion impressed thereto and comprising at least one rectilinear portion parallel to said belt.

Said pins or the like are carried by supports adjustable relative to said driving member and are themselves adjustable with respect to said supports, so that the device may be set as a function of the dimensions of the objects to be distributed and of their desired relative spacing.

Other features and advantages of this invention will appear as the following description proceeds with reference to the accompanying drawings illustrating diagrammatically by way of example typical embodiments of the apparatus constituting the subject-matter of this invention. In the drawings:

FIGURE 8 is a section taken upon the line VIII—VIII of FIGURE 7.

Figure 1:
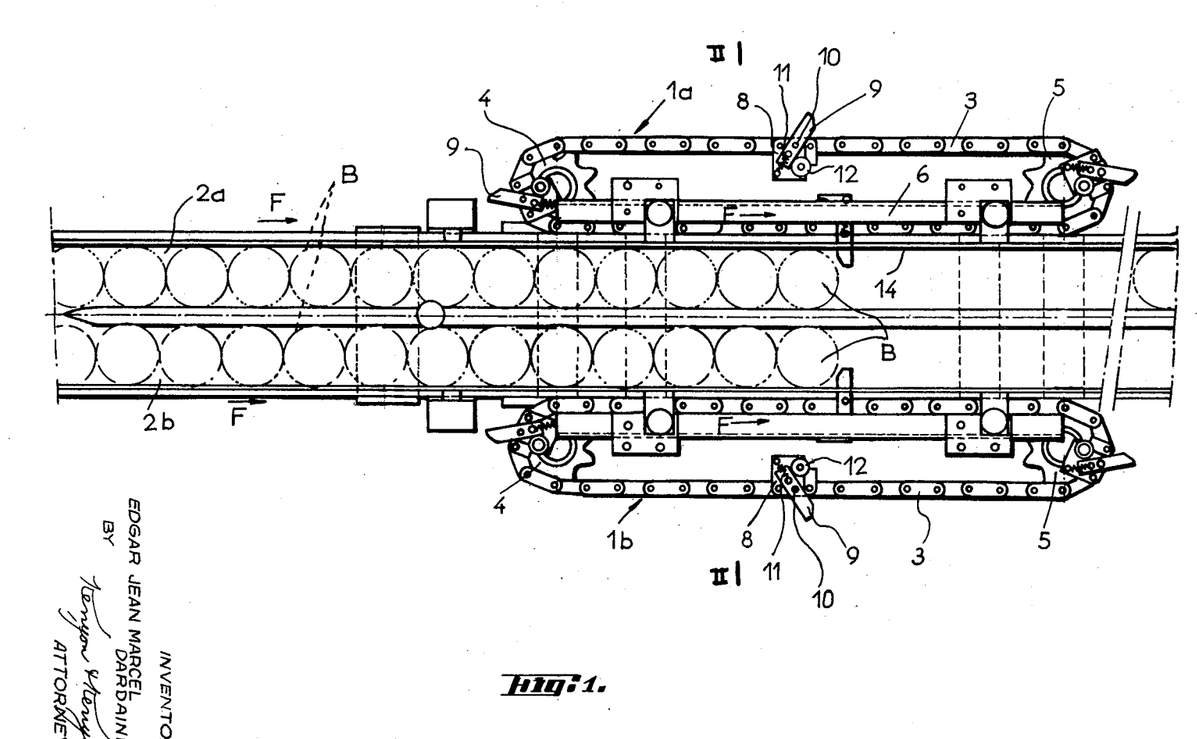
FIGURE 1 is a fragmentary plane view from above showing an installation equipped with a first form of embodiment of the apparatus of this invention, only the grouping device being visible in this figure.

Referring to the drawings, FIGURE 1 shows in fragmentary plane view from above a typical installation for automatically transporting and encasing bottles; in this figure two grouping devices 1a and 1b of identical design are shown. These grouping devices constituting the first section of the apparatus of this invention are adapted to assemble for example by groups of six a continuous supply of bottles B conveyed by a conveyor belt 2a, 2b travelling in the direction of the arrow F at a velocity V which may be the same for both belts.

Figure 2:
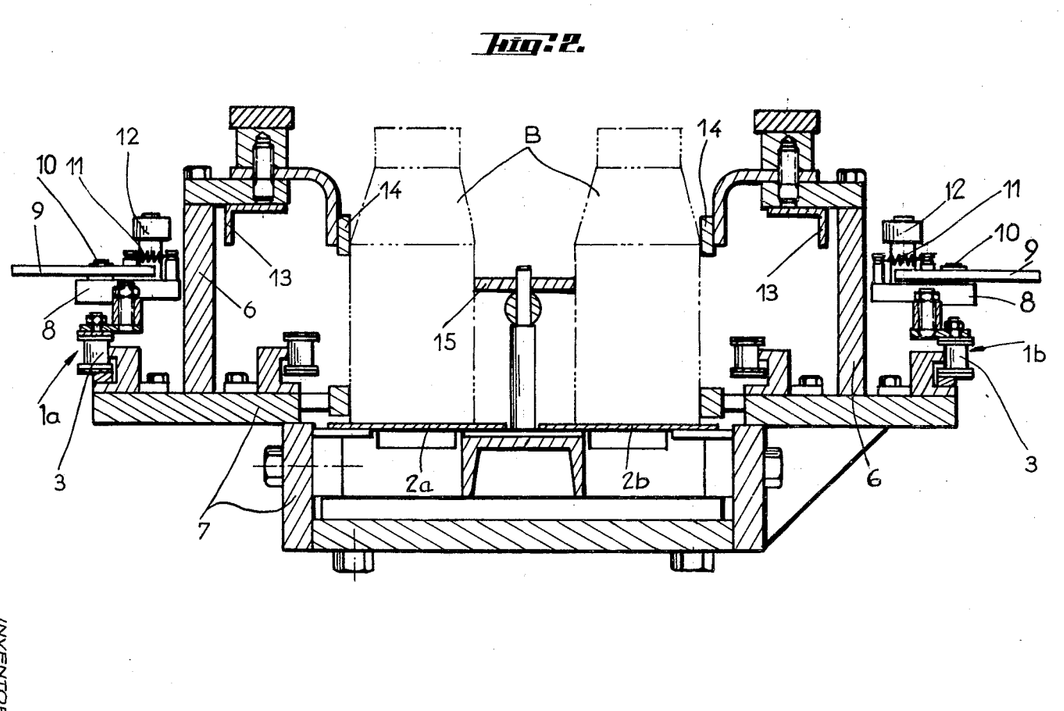
FIGURE 2 is a section taken upon the line II—II of FIGURE 1.

Each grouping device 1a or 1b consists of an endless chain 3 in meshing engagement with a pair of sprockets 4, 5 carried by a frame 6 rigid with the main frame 7 of the installation. At least one of these sprockets, for example sprocket 5, is a driving sprocket and connected through any known and suitable transmission system to the power unit or motor of the machine (not shown) which drives the chain 3 so that the rectilinear run of this chain which is closely adjacent to the belt has the same direction of translation as this belt. The chain has secured thereon at spaced intervals a plurality of supports 8 carrying stop members 9 pivotally mounted on a vertical pivot pin 10 and normally urged by a return spring 11 to an inclined position relative to the chain 3. Each support 8 further comprises a roller 12 adapted, when said support travels along the operative portion of the chain path which is the rectilinear portion thereof in close vicinity of the belt 2a or 2b, to engage an angle member or like guide member 13 rigid with the frame 6.

The aforesaid supports 8 may be mounted on the chain 3 through any suitable means and be secured on any desired links of this chain so that the relative spacing between any pair of adjacent supports and therefore between two adjacent stop members 9 can be selected and adjusted at will. This relative spacing is determined of course by the number of bottles to be assembled in a same group.

Preferably, the linear speed V' impressed to the chain 3 differs appreciably from the velocity of translation or linear speed V of the belt which may exceed the chain speed in the ratio 5:1 for instance.

The bottles B placed on the belts 2a or 2b in succession but at random, that is, with any casual and variable relative spacing, between any pair of adjacent bottles, are caused to travel at a speed V on the belt while being guided between guide rails 14 and 15 rigid with the frames 6 and 7 respectively, until the first one of said bottles engages that stop member 9 of chain 3 which, after turning about the sprocket 4, is brought above the belts 2a or 2b. This first bottle pushes the stop member 9 against the resistance of spring 11 until said stop is brought to a position substantially at right angles to the direction of translation of the machine, whereafter the bottle is caused to travel at the same speed V' as the stop member 9 proper, whereby all the following bottles which, until then, moved at a velocity V, are retarded in the same fashion, slide on the belt and are caused to contact one another. When the next stop member 9 arrives in turn above the belt 2a or 2b, it engages the interstice for example between the sixth and seventh bottles (according to the regular spacing selected for the stop members 9) so that it remains pressed against the sixth bottle. When the first stop member completes the travel corresponding to the operative run of chain 3, that is, when it begins to rotate about the sprocket 5 so as to move away from the belt 2a or 2b, the six bottles disposed between the two stop members aforesaid are released and subsequently carried along by the belt at a velocity V while the seventh bottle, pushed by the oncoming bottles from the rear, pushes in turn the stop member 9 behind which it lies so as to be retained by this stop member until it has completed the operative portion of the chain travel.

Under these conditions, it is clear that the bottles are divided into homogeneous, separate groups consisting each, in this specific example, of six bottles.

Figure 3:
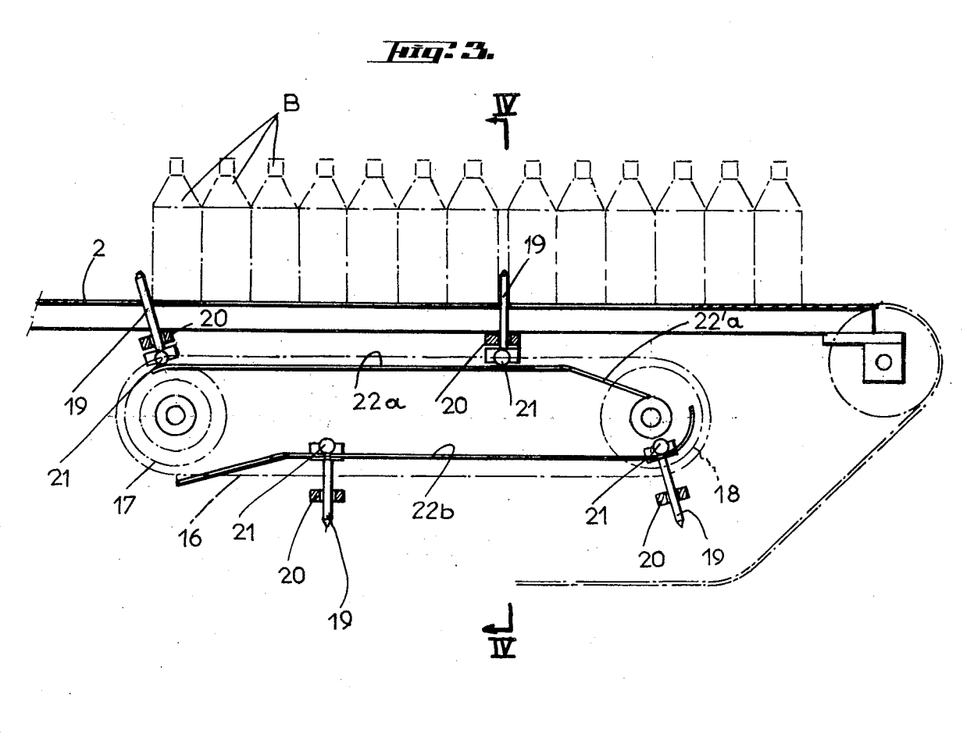
FIGURE 3 illustrates diagrammatically in elevational view a modified embodiment of said grouping device.
Figure 4:
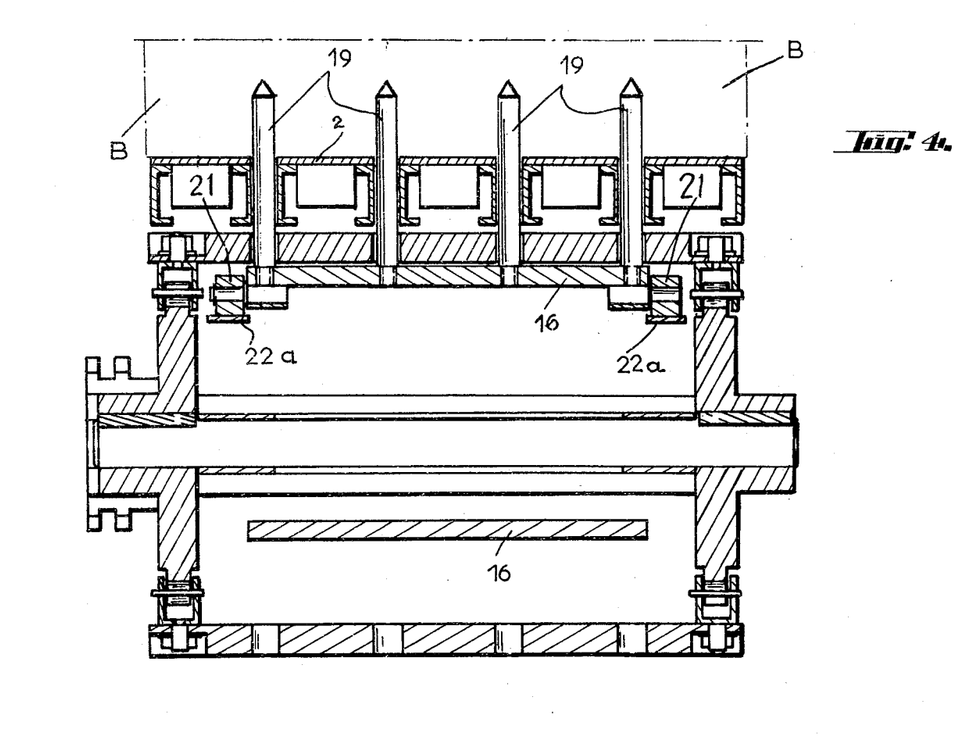
FIGURE 4 is a view taken in the direction of the arrows IV—IV of FIGURE 3.

FIGURES 3 and 4 illustrate a modified embodiment of the grouping device wherein the endless chain 16 associated with the sprockets 17 and 18, and disposed in a substantially vertical plane underlies a conveyor belt 2 travelling in the direction of the arrow F. In this alternate embodiment, the stop members consist of sliding rods 19 mounted on supports 20 rigid with chain links. Each rod 19 carries on its inner end a roller 21 adapted to engage a control member adapted to position the relevant rod in synchronism with the chain movement. This control member consists in this example of a fixed rail comprising two sections 22a and 22b engageable by the rollers 21. It will be seen that each rod 19, as it moves above the belt 2, is pushed upwards by the inclined ramp 22'a of rail 22a so as to protrude between the bottles and retard them, as in the case of the stop member 9 of the preceding example. When the rod 19 completes its travel with the operative run of chain 16, that is, when it begins to rotate about the sprocket 17, it releases the group of bottles assembled between this rod and the next rod upstream. The group of bottles thus formed is then carried along at the same velocity as the belt.

Of course, the belt 2 is so constructed that the rods 19 may extend therethrough.

It will be seen that with this alternate embodiment of the grouping device it is possible, if the machine comprises a plurality of conveyor belts disposed side by side, to arrange the device between two adjacent belts so that a same device may be used for dividing the objects simultaneously into two or more rows.

Figure 5:
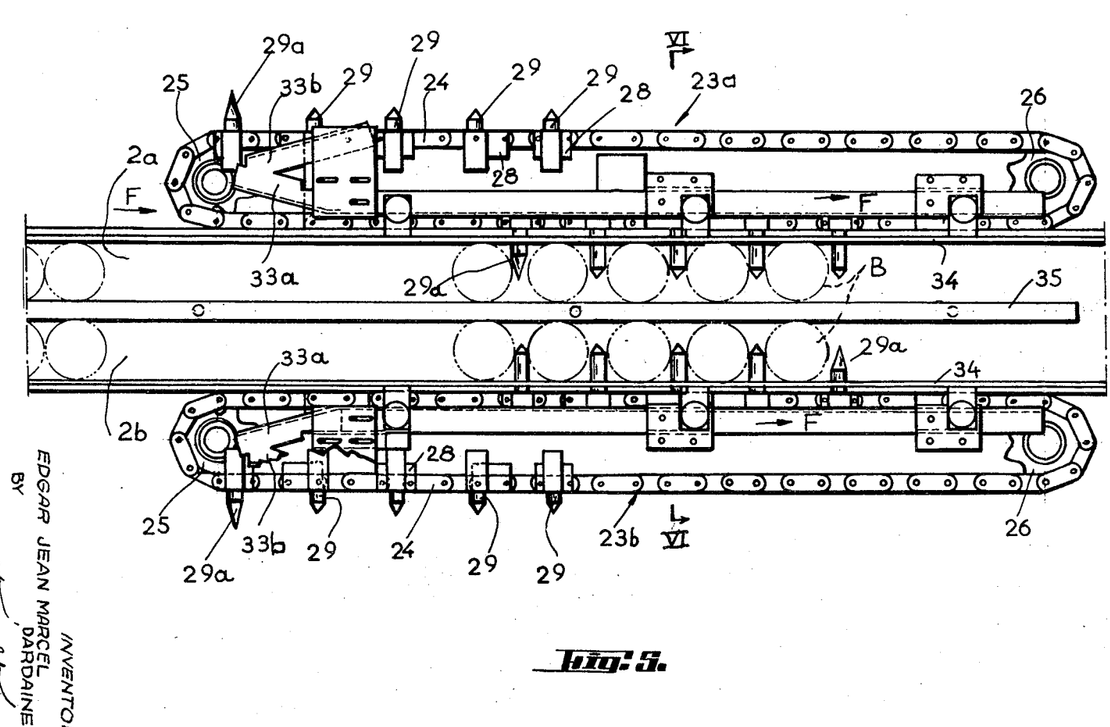
FIGURE 5 is a fragmentary view from beneath showing the installation of FIGURE 1, only the distributing device being visible in this figure.

FIGURE 5 is a fragmentary plane view from above showing the machine for transporting and encasing bottles of FIGURE 1, this view showing two distributing devices 23a and 23b of same design, constructed according to this invention. These distributing devices constituting the second section of the apparatus according to this invention are adapted to set all the bottles or like objects B, which have previously been grouped into equal series by the grouping devices 1a and 1b, at the same relative spacing.

Figure 6:
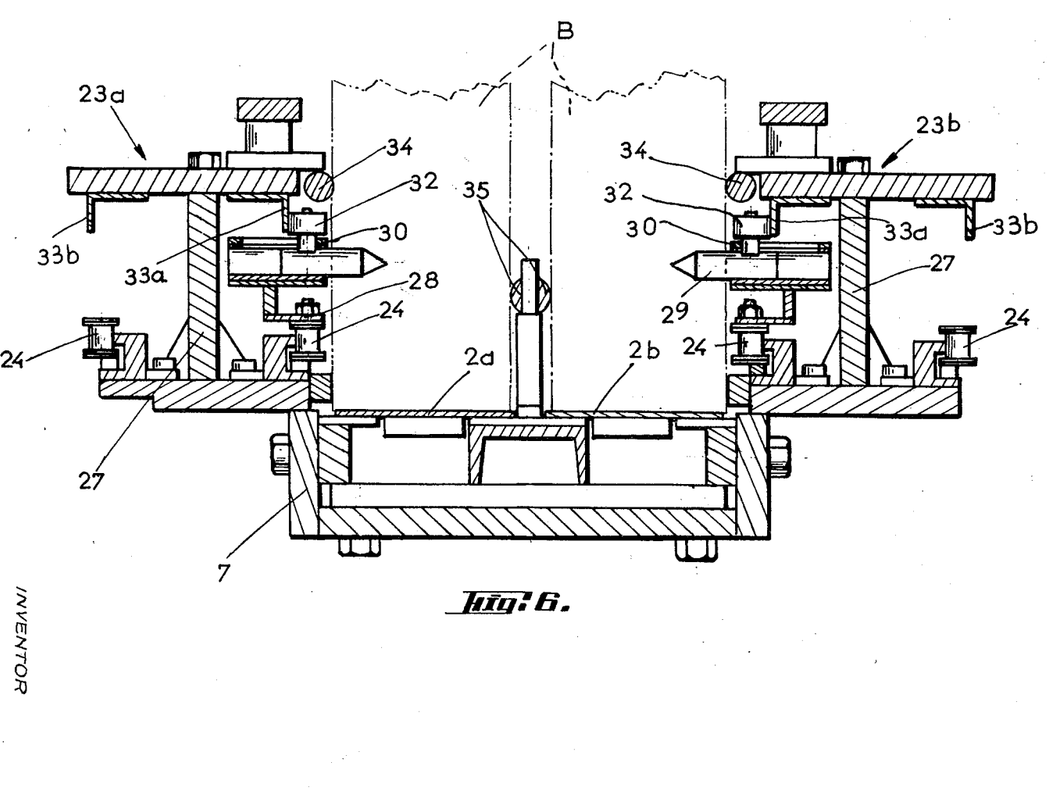
FIGURE 6 is a section taken upon the line VI—VI of FIGURE 5.

Each distributing device 23a or 23b consists of an endless chain 24 in constant meshing engagement with a pair of sprockets or pulleys 25, 26 carried by a frame 27 rigid with the main framework of the machine. At least one of these sprockets, for example sprocket 26, is driven and connected through any suitable and known transmission system to the power unit or motor of the machine (not shown) driving the chain 24 in such a manner that its rectilinear run adjacent to the belt 2a or 2b has the same direction of translation as this belt. Secured on the chain 24 are supports 28 of which the relative spacing is substantially equal to the diameter of the conveyed bottles. These supports carry in turn pins, fingers, bolts or like members 29 slidably mounted in sleeves or sockets 30 extending substantially at right angles to the direction of motion of chain 24.

The supports 28 may be mounted on the chain 24 through any known and suitable means, and be secured on any one of the chain links so that the relative spacing between any two adjacent supports may be selected and adjusted at will. Moreover, the position of each pin 29 may be adjusted relative to its corresponding support; the distance between two successive pins 29 is determined, of course, by the diameter of the bottles or like articles to be encased. These pins 29 are grouped into series disposed at spaced intervals along the chain 24.

Each pin 29 carries a roller 32 (FIGURE 6) engaging guide rails or like members 33a and 33b. It will be seen that the function of rail 33b is to cause each pin 29 to recede into its sleeve or socket 30 before its support has rotated about the sprocket 25, and that the function of rail 33a consists in ejecting the pin from its sleeve when the support travels along the rectilinear operative portion of chain 24. However, the first pin 29a of each series is stationary relative to its socket and kept in its outermost position in relation thereto.

Preferably, the chain 24 is driven at a linear velocity V" substantially equal or slightly inferior to the velocity of translation V of the belts.

The bottles B delivered to the belt 2a or 2b so as to form compact groups thereon are guided between the guide rails 34 and 35 rigid with the frame 27 and frame 7 respectively at a velocity V until the first bottle engages that finger 29 of chain 24 which, after rotating about the sprocket 25, arrives above the belt 2a or 2b. This group of bottles is then slightly retarded and caused to travel at the velocity V" of pin 29a proper. In this position, the other four pins 29 of the same series register substantially with an interstice between the bottles and when these pins engage the portion 33a of the guide rail they are pushed outside their sleeves between the bottles B so as to set them at a relative spacing corresponding for example to the distance between centres of the gripping devices (not shown).

Under these conditions, it is clear that the bottles arrive beneath the gripping heads with the proper relative spacing.

Figure 7:
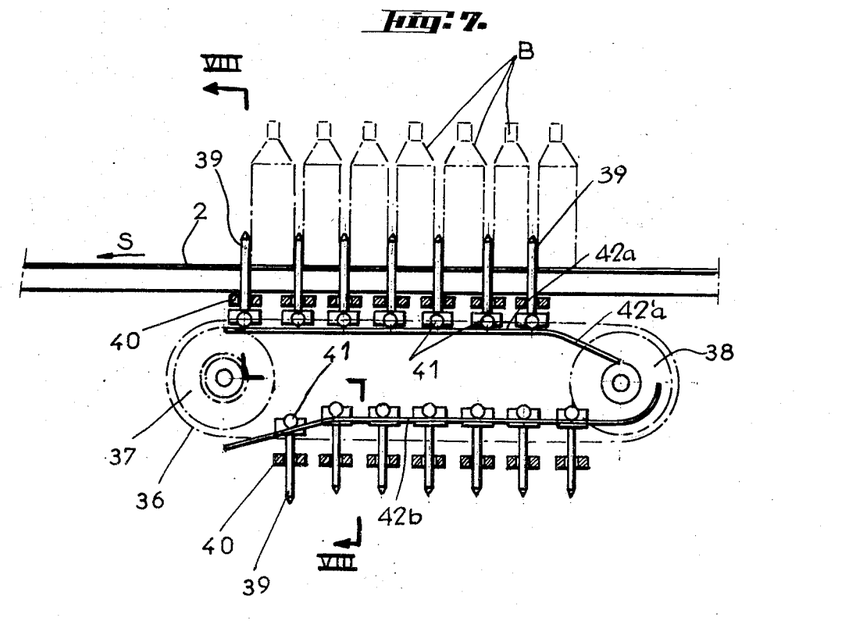
FIGURE 7 illustrates diagrammatically in front elevational view a distributing device according to a modified embodiment.

FIGURES 7 and 8 illustrate a modified embodiment of the distributing device which is intended more particularly and preferably for operating in conjunction with a grouping device of the type illustrated in FIGURES 3 and 4. An endless chain 36 passing around sprockets 37 and 38, and disposed in a substantially vertical plane, underlies a belt 2 travelling in the direction of the arrow S. In this alternate embodiment the pins 39 are mounted on supports 40 rigid with spaced links of chain 36. Each pin 39 carries a roller 41 adapted to engage a stationary rail comprising two portions 42a and 42b. It will be seen that each pin 39, when it underlies the belt 2, is pushed upwards by the inclined ramp 42'a of rail 42a engaging the roller 41, so that it projects between two adjacent bottles like the pins 29 of the preceding example described in conjunction with FIGURES 4 and 5. It is clear that the bottles B are thus fed to a position under the gripping heads or other gripping members with the proper relative spacing. When the pins 39 complete the rectilinear run corresponding to the operative portion of chain 36, they pivot about the sprocket 37 and return to the sprocket 38, ready for another distributing step.

It will be readily understood that with this alternate form of embodiment it is possible, if the installation comprises a plurality of endless belts disposed side by side, to arrange the device between two adjacent belts so that the same device may be used for properly and simultaneously spacing the objects of two or more rows.

Of course, the invention should not be construed as being limited by the specific and exemplary forms of embodiment described, illustrated or suggested herein, as many modifications and alterations may be brought thereto without departing from the scope of the invention as set forth in the appended claims.

What I claim is:

1. A device for positioning miscellaneous objects such as bottles, boxes and the like, comprising at least one conveyor belt onto which said objects are disposable in predetermined rows while said conveyor belt is travelling at a constant speed with a view of having them seized and transported in predetermined spacial relationship by gripping heads traveling continuously above said conveyor belt and a grouping device comprising a plurality of spaced stop members carried by supports mounted on at least one endless chain traveling in a direction parallel to the direction of translation of said conveyor belt, said stop members being adapted to be inserted between two of said objects so that said objects travel at the same speed as said stop members and are distributed over the belt into separate homogeneous groups, each having a predetermined number of objects contacting one another, a distributing device, disposed in relation to the direction of travel of said belt, after said grouping device, said distributing device comprising a plurality of pin members carried by supports mounted on at least one endless chain traveling in a direction parallel to the direction of translation of said belt, some at least of said pins being mounted so as to be capable of sliding in relation to said supports toward a first retracted position and a second extended position in which they project between the objects of one of said groups so as to space them from one another on said conveyor belt, said grouping device and said distributing device being driven in synchronized relation to each other and to said gripping heads, the velocity of said stop members being much lower than the velocity of said conveyor belt and in relation with the number and size of said objects, and the velocity of said pin members being lower than the velocity of said conveyor belt and equal to the velocity of said gripping heads.

2. Apparatus according to claim 1 wherein said endless chain carrying said stop members and said endless chain carrying said pin members are located in a horizontal plane above said belt and extends laterally in relation to said belt.

3. Apparatus according to claim 2, wherein said pin members are distributed in series on said endless chain, each series comprising at least as many pins as there are objects in each group, the first pin of each series being fixed, the other being slidably mounted.

4. Apparatus according to claim 1 wherein said endless chain carrying said stop members and said endless chain carrying said slidable pin members are located in a substantially vertical plane under said conveyor belt.

5. Apparatus according to claim 4 wherein said stop members each consist of a rod slidably mounted on said support and provided with a roller follower cooperating with a stationary rail controlling the sliding movement of said rod in synchronism with the displacement of said endless chain.

6. Apparatus according to claim 4 wherein said slidable pin members are distributed in series on said endless chain, each series comprising at least as many pins as there are objects in each group, each pin member being provided with a roller follower cooperating with a stationary rail controlling the sliding movement of said pin member in synchronism with the displacement of said endless chain.

References Cited by the Examiner

UNITED STATES PATENTS

| 2,805,755 | 9/57 | Jones | 198—34 |
|---|---|---|---|
| 3,071,236 | 1/63 | Hahn | 198—34 X |

FOREIGN PATENTS

| 1,259,525 | 3/61 | France. |
|---|---|---|

SAMUEL F. COLEMAN, *Primary Examiner.*

EDWARD A. SROKA, *Examiner.*